UNITED STATES PATENT OFFICE.

WILLIAM Q. ADAMS, OF PORTLAND, OREGON.

COMPOSITION OF MATTER FOR BLACKING AND POLISHING STOVES.

SPECIFICATION forming part of Letters Patent No. 619,923, dated February 21, 1899.

Application filed October 31, 1898. Serial No. 695,101. (No specimens.)

*To all whom it may concern:*

Be it known that I, WILLIAM Q. ADAMS, a citizen of the United States, residing at Portland, county of Multnomah, State of Oregon, have invented a new and useful Composition of Matter to be Used for the Blacking and Polishing of Stoves, of which the following is a specification.

My composition consists of the following ingredients combined in the proportions stated—namely: pure hot water, two quarts; prepared graphite or plumbago, two and one-half pounds; oil of vitriol, two ounces, more or less; copper sulfate, one-half pound, more or less; gum-arabic, one-half ounce. These ingredients are to be thoroughly mingled by agitation and assume the consistency of cream.

In using the above-named composition the mixture is to be shaken and applied when stove is cold with brush or flannel cloth. Rub till dry.

By the use of the above-named composition the blacking adheres to the stove and retains its glossy appearance a greater length of time than any other blacking in the market, and water spilled on stove when it is hot does not wash blacking off like other blacking on the market.

I am aware that blacking compositions contain the graphite or plumbago and may contain one or more of the ingredients above named; but I am not aware that all the ingredients of my composition in the proportions stated have been used together.

What I claim, and desire to secure by Letters Patent of the United States, is—

The herein-described composition of matter to be used for blacking and polishing stoves consisting of water, graphite or plumbago, oil of vitriol, copper sulfate, and gum-arabic in proportions stated or specified.

WILLIAM Q. ADAMS.

Witnesses:
HARRY B. HOLMAR,
OGLESBY YOUNG.